United States Patent
Gorsica et al.

(10) Patent No.: US 11,415,963 B2
(45) Date of Patent: Aug. 16, 2022

(54) DRONE-BASED POWER SEARCH AND HARVESTING

(71) Applicant: Motorola Mobility LLC, Chicago, IL (US)

(72) Inventors: John Gorsica, Round Lake, IL (US); Michael Russell, Lake Zurich, IL (US); Rachid Alameh, Crystal Lake, IL (US)

(73) Assignee: Motorola Mobility LLC, Chicago, IL (US)

( * ) Notice: Subject to any disclaimer, the term of this patent is extended or adjusted under 35 U.S.C. 154(b) by 0 days.

(21) Appl. No.: 16/569,710

(22) Filed: Sep. 13, 2019

(65) Prior Publication Data

US 2021/0080932 A1    Mar. 18, 2021

(51) Int. Cl.
  *G05B 19/4155*    (2006.01)
  *H02J 50/00*      (2016.01)
  *H02J 50/10*      (2016.01)
  *H02J 7/02*       (2016.01)

(52) U.S. Cl.
  CPC ............ *G05B 19/4155* (2013.01); *H02J 7/02* (2013.01); *H02J 50/001* (2020.01); *H02J 50/10* (2016.02); *G05B 2219/31004* (2013.01); *G05B 2219/32423* (2013.01)

(58) Field of Classification Search
  None
  See application file for complete search history.

(56) References Cited

U.S. PATENT DOCUMENTS

| | | | |
|---|---|---|---|
| 2017/0170675 A1* | 6/2017 | Ni Scanaill | H02J 7/34 |
| 2018/0237138 A1* | 8/2018 | Phan | G08G 5/0039 |
| 2018/0281945 A1* | 10/2018 | Needham | H02J 50/10 |
| 2018/0287663 A1* | 10/2018 | Bogdan | H04L 12/4625 |
| 2018/0292223 A1* | 10/2018 | Leach | H04N 5/23216 |
| 2020/0031497 A1* | 1/2020 | Wheatley | B63B 35/50 |

OTHER PUBLICATIONS

"Solar Powered Drone Could Fly Nonstop for Five Year", Unknown exact publication date but believed to be prior to filing of present application; Viewed online May 11, 2021 at https://www.iflscience.com/technology/solar-powered-drone-could-fly-nonstop-five-years/.
Baldwin, R , "Wireless Charging Will Make Drones Always Ready to Fly", Published Oct. 20, 2017; Viewed online May 11, 2021 at https://www.engadget.com/2017-10-20-wireless-charging-will-make-drones-always-ready-to-fly.html.

(Continued)

*Primary Examiner* — Charles E Anya

(57) ABSTRACT

Systems and methods for providing power search and harvesting in a drone device provide execution of one or more tasks, wherein one of the tasks has a higher priority than the remaining tasks. A power mode is determined for executing the highest priority task by sequentially determining whether the highest priority task can be executed in one of a plurality of execution scenarios including from a charging pad associated with the drone, from another location using energy harvested from an existing energy source, from another location using energy harvested from an energy source enabled by the drone, or from another location using battery power alone. The highest priority task is executed in keeping with the first usable execution scenario found during the sequential determination.

20 Claims, 4 Drawing Sheets

(56) References Cited

OTHER PUBLICATIONS

Hymel, Shawn, "Light-Seeking Robot", SparkFun Inventors Kit; Unknown Exact availability date but believed to be prior to filing of present application; Viewed online May 11, 2021 at https://learn.sparkfun.com/tutorials/light-seeking-robot.

Leary, Warren, "Designed for Other Worlds, Robot is to Follow the Sun", NY Times Article; Published Jun. 26, 2001; Viewed online May 11, 2021 at https://www.nytimes.com/2001/06/26/science/designed-for-other-worlds-robot-is-to-follow-the-sun.html.

RCTESTFLIGHT, , "RC Helicopter Blade Wing Generator", YouTube Video published Mar. 2, 2013; Viewed online May 11, 2021 at https://www.youtube.com/watch?v=LnbZ00Pnpw4.

* cited by examiner

DRONE-BASED POWER SEARCH AND HARVESTING

TECHNICAL FIELD

The present disclosure is related generally to drone devices and, more particularly, to systems and methods for facilitating drone-based power source location and harvesting.

BACKGROUND

The Internet has taken on an important role in commerce, entertainment, manufacturing and most other areas of life and society. As Internet connectivity continues its advance into the everyday world, it is being introduced into more and more household and industrial devices and objects. These include, for example, refrigerators, thermostats, automobiles and even robots. This "Internet of things" (IoT), as it is commonly called, allows such devices to communicate and interact via the Internet, and, where appropriate, allows devices to be remotely monitored and controlled.

Mobile devices such as drones are becoming more prevalent in the IOT space. In a residential setting, for example, drones may be able to perform functions such as home monitoring, patrolling, and investigating. However, drones typically include their own self-contained power source, and as such have limited range and utility between charges.

Before proceeding to the remainder of this disclosure, it should be appreciated that the disclosure may address some or all of the shortcomings listed or implicit in this Background section. However, any such benefit is not a limitation on the scope of the disclosed principles, or of the attached claims, except to the extent expressly noted in the claims.

Additionally, the discussion of technology in this Background section is reflective of the inventors' own observations, considerations, and thoughts, and is in no way intended to be, to accurately catalog, or to comprehensively summarize any prior art reference or practice. As such, the inventors expressly disclaim this section as admitted or assumed prior art. Moreover, the identification or implication herein of one or more desirable courses of action reflects the inventors' own observations and ideas, and should not be assumed to indicate an art-recognized desirability.

BRIEF DESCRIPTION OF THE SEVERAL VIEWS OF THE DRAWINGS

While the appended claims set forth the features of the present techniques with particularity, these techniques, together with their objectives and advantages, may be best understood from the following detailed description taken in conjunction with the accompanying drawings of which:

DETAILED DESCRIPTION

Before discussing embodiments of the disclosed principles in full detail, an overview of certain embodiments is given to aid the reader in understanding the later more detailed discussion. As noted above, while drone applications in the IoT space are increasing, the range and applicability of drones is still limited by the power capacity of the drone's self-contained power source between charges. Thus, the ability of drones to perform functions away from the drone charging dock—e.g., home monitoring, patrolling, and investigating—remains limited.

In an embodiment of the disclosed principles, a drone is configured to seek out multiple energy sources and may optimize which source is used based on the drone's assigned task. The drone may also control one or more energy sources to autonomously enable them. More specifically, the drone is provided with a system for harvesting solar, wind or other power while away from a dedicated charging dock. In an embodiment, the drone comprises sensors to seek out and land or perch near sources of harvestable power. In a further embodiment, the drone includes an IOT connection to selectively enable harvestable power sources. This could include, for example, turning on a light or fan so that electromagnetic or wind power can be harvested.

In a further embodiment, the system provides prioritization of methods of charging based on the drone's assigned task. For example, a first charging source that is less efficient than a second charging source may nonetheless be preferred if it allows the drone to more efficiently perform a task such as monitoring a certain area.

With this overview in mind, and turning now to a more detailed discussion in conjunction with the attached figures, the techniques of the present disclosure are illustrated as being implemented in or via a suitable device environment. The following device description is based on embodiments and examples within which or via which the disclosed principles may be implemented, and should not be taken as limiting the claims with regard to alternative embodiments that are not explicitly described herein.

Figure 1:
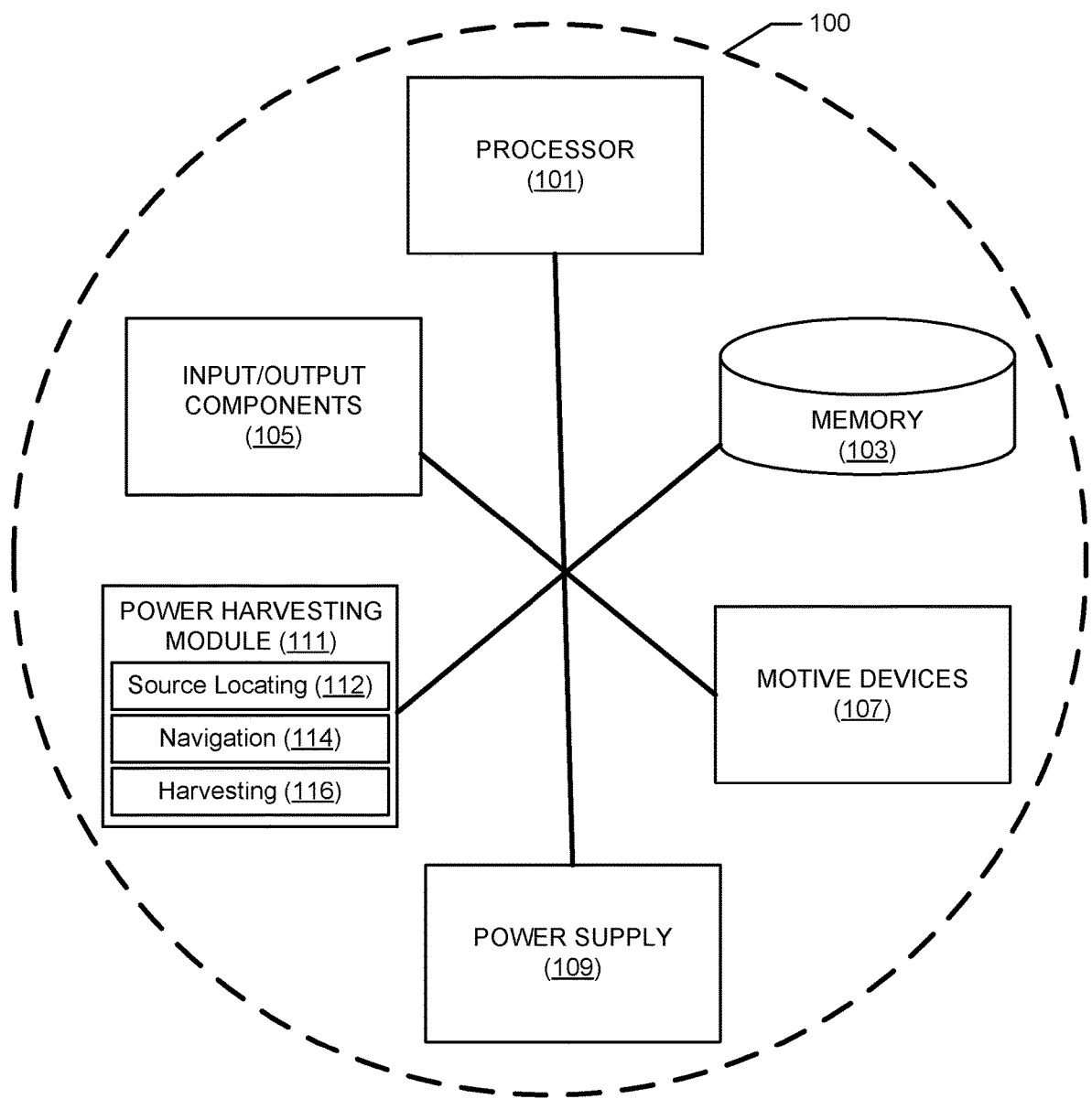
FIG. 1 is a schematic architectural representation of drone device components via which various embodiments of the disclosed principles may be implemented.

Thus, for example, while FIG. 1 illustrates an example computing environment with respect to which embodiments of the disclosed principles may be implemented, it will be appreciated that other computing architectures may be used. It will also be appreciated that additional or alternative components may be used in a given implementation of the disclosed principles depending upon user preference, component availability, price point and other considerations.

In the illustrated embodiment, the components of the drone device 100 include a processor 101, a memory 103, one or more data or control input and output components 105 such as RF input facilities or wired input facilities, including, for example, one or more antennas and associated circuitry and logic. The antennas and associated circuitry may support any number of protocols, e.g., WiFi, Bluetooth, cellular, etc.

The drone device 100 as illustrated also includes one or more powered motive devices 107, which may include one or more of an air or water propeller, a rotor, a wheel, a track, a ducted fan, a chemical reaction thruster or any other suitable motive device able to move the drone device 100. The powered motive device 107 may include both lift and propulsion devices or may use a single motive device type for both lift and propulsion, as is the case with a most helicopter-type drones, e.g., helicopters, quadcopters, single axis counter rotating copters and other rotor-powered drone devices.

The processor 101 can be a microprocessor, microcomputer, application-specific integrated circuit, or other suitable integrated circuit. For example, the processor 101 can be implemented via one or more microprocessors or controllers from any desired family or manufacturer. Similarly, the memory 103 is a non-transitory media that may (but need not) reside on the same integrated circuit as the processor 101. Additionally or alternatively, the memory 103 may be accessed via a network, e.g., via cloud-based storage. The memory 103 may include a random access memory (i.e., Synchronous Dynamic Random Access Memory (SDRAM), Dynamic Random Access Memory (DRAM), RAMBUS Dynamic Random Access Memory (RDRM) or any other type of random access memory device or system). Additionally or alternatively, the memory 103 may include a read-only memory (i.e., a hard drive, flash memory or any other desired type of memory device).

The information that is stored by the memory 103 can include program code (e.g., applications) associated with one or more operating systems or applications as well as informational data, e.g., program parameters, process data, etc. The operating system and applications are typically implemented via executable instructions stored in a non-transitory computer readable medium (e.g., memory 103) to control basic functions of the electronic device 100. Such functions may include, for example, interaction among various internal components and storage and retrieval of applications and data to and from the memory 103.

Further with respect to the applications and modules, these typically utilize the operating system to provide more specific functionality, such as file system service and handling of protected and unprotected data stored in the memory 103. In an embodiment, modules are software agents that include or interact with hardware components such as one or more sensors, and that manage the device 100's operations and interactions with respect to the described embodiments.

With respect to informational data, e.g., program parameters and process data, this non-executable information can be referenced, manipulated, or written by the operating system or an application. Such informational data can include, for example, data that are preprogrammed into the device during manufacture, data that are created by the device or added by the user, or any of a variety of types of information that are uploaded to, downloaded from, or otherwise accessed at servers or other devices with which the device is in communication during its ongoing operation.

In an embodiment, an electrical power supply 109, such as a battery or fuel cell, is included for providing power to electrical components of the drone device 100. The same electrical power supply may also power the one or more motive devices 107, which may be include and be actuated via respective electrical motors. Additionally or alternatively, the device 100 may be powered by a separate power source, e.g., a fuel storage module (e.g., a gas tank for gas-powered drones), or a separate battery in the case of electrically-powered drones.

In an embodiment, the processor 101 and memory 103 interact with the other components of the device 100 to perform a variety of functions. The processor 101 may include or implement various modules, and may execute programs for initiating different activities such as flight control, take-off and landing control, terrain avoidance, navigation, and so on.

A power harvesting module 111, which will be discussed in greater detail later herein, is provided to manage the energy harvesting activities of the drone 100, e.g., by identifying charging sources, prioritizing charging sources, and managing charging while at a given source. It will be appreciated that the charging may be implemented as a separate module in the manner illustrated, or may comprise computer-executable instructions and interfaces spread among other components of the drone 100. The submodules or subroutines executed by the power harvesting module 111 include a source locating module 112, which identifies one or more harvestable charging sources reachable by the drone device 100, a navigation module 114, which guides or controls navigation of the drone device 100 from the present location to one of the located harvestable charging sources, and a harvesting module 116, which controls harvesting of the energy from a selected harvestable charging source, e.g., by controlling energy capture systems as well as, if needed, deploying elements such as probes to affix the drone device 100 on, at or near the selected harvestable charging source.

Figure 2:
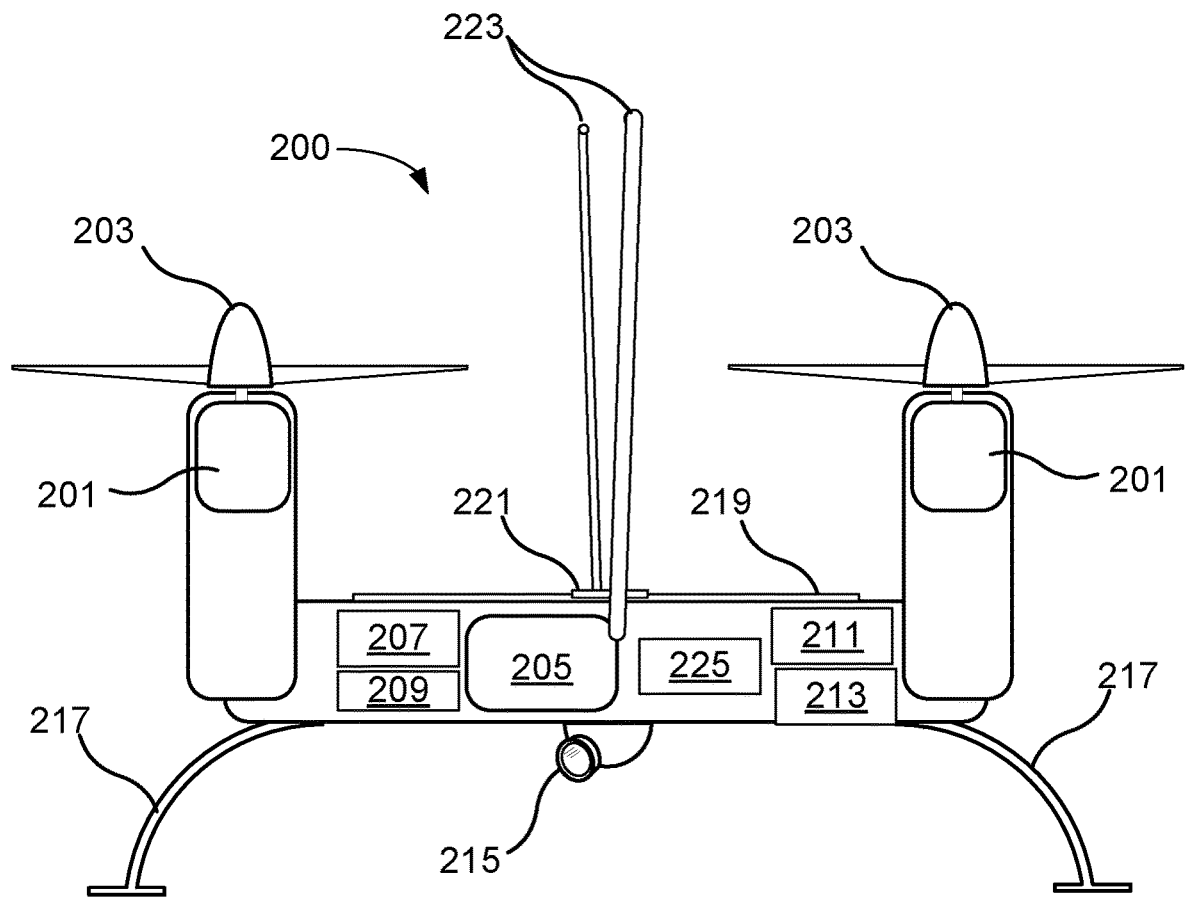
FIG. 2 is a schematic drawing showing a physical arrangement of drone device within which embodiments of the disclosed principles may be implemented.

With respect to controlling energy capture systems, the energy capture systems may include one or more solar panels (see e.g., FIG. 2, solar panel 219), one or more wind turbines (e.g., as described with respect to the motors 201 and propeller systems 203 of FIG. 2), thermoelectric harvesting mechanism (e.g., energized when drone 100 lands on a hot or cold surface), RF harvesting using an antenna, and vibration harvesting via piezoelectric conversion (e.g., energized when the drone 100 lands on or otherwise contacts a vibration source such as a clothes dryer or washing machine).

The described modules of the power harvesting module 111 may employ one or more other systems in executing their roles. For example, a GPS module, discussed more below, may be used by the source locating module 112 to identify the current location of the drone device 100, which is then used to determine which charging sources are nearby. Similarly, the navigation module 114 may use the GPS system to provide navigation from one location (e.g., current location) to another location (e.g., location of selected harvestable charging source.

In order to locate possible charging sources in the first instance, any suitable method may be used. In an embodiment of the described principles, the source locating module 112 employs a map of known locations to harvest power. The navigation module 114 may navigate the map using navigation sensors such as GPS, as in the above example, and/or LIDAR (light detection and ranging), RADAR (radio detection and ranging), ultrasonic range finding and imaging, cameras, beacon systems, etc.

The source locating module 112 may also discover potential charging sources using sensors, e.g., discovering a lamp by using optical sensors. In an embodiment, newly-discovered sources of power are added to the map of known locations. Additionally or alternatively, the source locating module 112 may, for power sources that advertise their presence, e.g., via Bluetooth beacons, locate such sources via RF analysis. For example, the drone 100, having received a beacon associated with an energy source, may analyze the RSSI (received signal strength indicator) or ToF (Time of flight) associated with the beacon to assess the distance to the source.

FIG. 2 is a schematic view of an example drone 200 in which various described embodiments may be implemented. The motive devices (see FIG. 1, element 107) of the illustrated drone 200 include two motors 201 coupled to two respective propeller systems 203. The regulated control of these motors 201 by a motor controller 213 allows the drone 200 to rotate in place, turn, rise, fall, and generally determine the location of the drone 200 in three dimensions.

The illustrated drone 200 also includes a battery 205 for powering the motive devices such as the motors 201, as well as all other electrical activities on the drone 200. It should be noted that an alternative power source such as solar panel 219 may be included for either or both of charging the battery 205 and powering other aspects of the drone 200, whether motive or computational. In addition, a wind capture source such as motors 201 and propeller systems 203, or a dedicated turbine or propeller, may be used to charge the battery 205 or power elements of the drone 200 by capturing ambient airflow. Ambient airflow may arise from a local vent or fan, or, if outdoors, from wind or thermals.

For determining movement and position, the drone may be equipped with one or more locational system such as a GPS module 207 and an inertial position sensor (IPS) module 209. The former gives an estimate of location while the latter integrates inertially-sensed movements between GPS events to verify location and also to determine an angular orientation of the drone 200.

The drone 200 may also include one or more environmental data gathering systems such as a camera 215 and proximity sensor 221. The proximity sensor 221 may be, for example, an RFID sensor, an IR sensor, an echo locator, a laser range finder and so on. A processor 211 (see FIG. 1, element 101) is directly or indirectly linked to the electrical elements of the drone in order to determine and control drone status and movements and to control drone activity, such as charging.

To enable the drone 200 to rest on a generally horizontal surface, the drone 200 as illustrated incorporates one or more landing struts 217, e.g., beneath the drone 200. For docking vertically to an overhead location of interest such as a light or fan fixture, the drone may also include one or more probes 223, which can be locked into or onto a suitable physical structure such as a rim, opening, perch or housing. The probes 223 may be actuated via motors or other electromotive actuators such as piezoelectric elements (not shown).

As noted above, the drone 200 is able, in an embodiment, to control IoT elements of the local environment, e.g., fans, lights, doors, thermostats and so on. To this end, as well as for programming, upgrade, data acquisition or transfer, the drone 200 preferably also incorporates a networking module 225 (see FIG. 1, input/output components 105). In this way, the drone 200 is able to connect to IoT (Internet of Things) devices over the internet to gather status and/or assert control.

Figure 3:
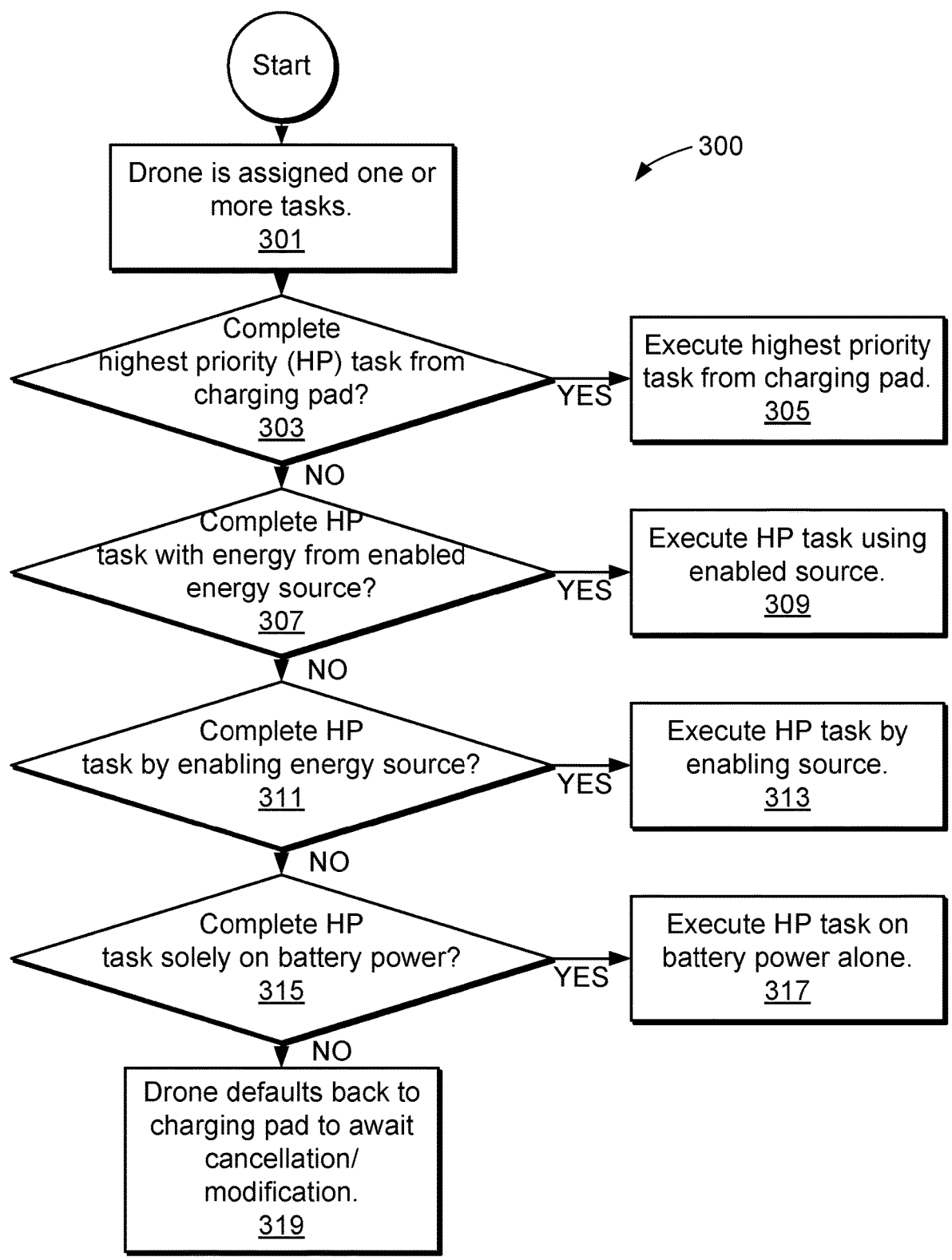
FIG. 3 is a flow chart showing a method of drone-based power search and harvesting in accordance with an embodiment of the disclosed principles.

In operation, the processor 211 of the drone 200 executes computer-executable instructions retrieved from nontransitory memory (see FIG. 1, memory 103) or received in real-time over the networking interface in order to execute one or more tasks set for the drone 200, as well as to facilitate charging of the drone 200 from ambient sources when needed. In this connection, FIG. 3 is flowchart showing a method of method of identifying, prioritizing, and harvesting from one or more available energy sources.

At stage 301 of the illustrated process 300, a drone such as the drone 200 of FIG. 2 is assigned one or more tasks, such as monitoring an area, searching for a person, searching for an object and so on. Although the term "assign" is used herein, it will be appreciated that the drone itself may provide the assignment. For example, the drone processor may determine an assignment based on its own programming, e.g., as needed in order to meet higher level objectives. In this way, the drone may act autonomously based on higher level requests from another system or entity, by breaking objectives down into individual tasks.

The tasks have priority levels which may differ from one task to the other. The drone (via its processor) determines at stage 303 whether the highest priority task (or the only task if only one task is assigned) can be achieved from the location of a dedicated charging pad, e.g., an inductive charging pad. If the drone is able to perform the highest priority task while located at the dedicated charging pad, then the drone executes the highest priority task from the dedicated charging pad at stage 305.

Otherwise, the drone determines at stage 307 whether the highest priority task can be completed from another location away from the charging pad while harvesting energy from an energy source already enabled at that location, e.g., a lamp, fan, etc. If it is determined that the highest priority task can be completed from the other location while harvesting energy from an already enabled energy source, then the process 300 moves to stage 309, wherein the drone executes the highest priority task at the other location while harvesting energy from the already enabled energy source.

If the drone cannot complete the highest priority task from the other location while harvesting energy from an already enabled energy source, then the process 300 flows to stage 311, wherein the drone determines whether the highest priority task can be completed from that location while harvesting energy from an energy source that is not yet enabled, but that the drone is able to wirelessly enable, e.g., via an IoT command. In the event that this can be accomplished, the drone enables the energy source at that location in stage 313 and executes the highest priority task while harvesting energy from the now-enabled energy source.

However, it may be the case that none of the execution and charging scenarios evaluated thus far in the process 300 enable the drone to execute its highest priority task. In this case, the drone determines at stage 315 whether it is able to execute the highest priority task while operating solely on battery power (see, e.g., battery 205 of FIG. 2). This determination may depend on the battery state of charge.

If the drone is able to execute the highest priority task in this way, i.e., using nothing more than battery power, then the drone executes the task in this manner at stage 317. Otherwise, the drone defaults back to the charging pad at stage 319, e.g., to await cancellation of the assigned task, or modification of the assigned task or its priority.

In an optional embodiment, the drone may instead execute the highest priority one of the remaining tasks using the same determination process 300. Thus, for example, it may be that the second-highest priority task can be executed prior to the drone returning to the charging pad to await cancellation of the assigned task, or modification of the assigned task or its priority.

Figure 4:
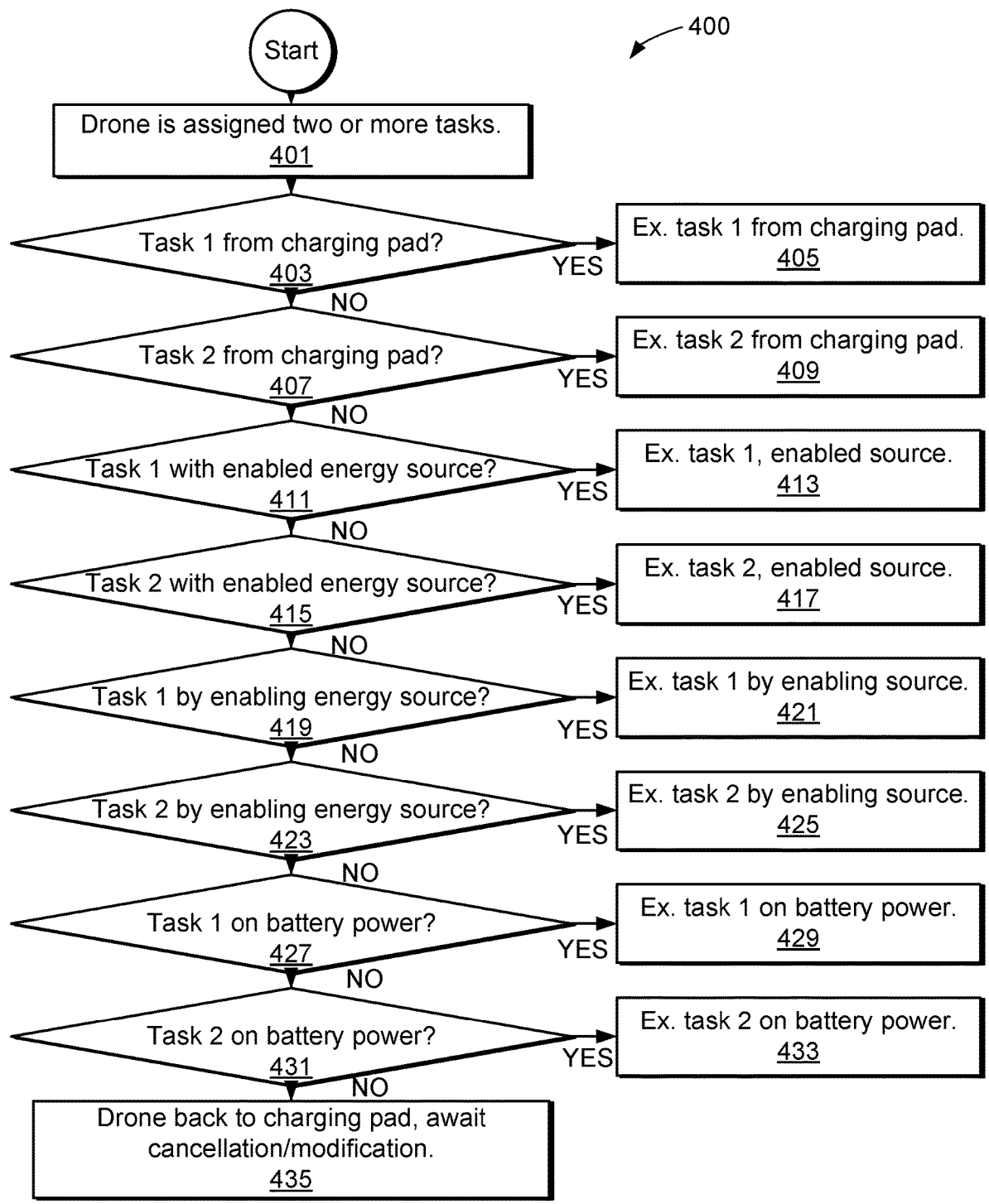
FIG. 4 is a flow chart showing an alternative method of drone-based power search and harvesting in accordance with an embodiment of the disclosed principles.

If at least two of the assigned tasks are of equal priority (or no priority), the drone may prioritize the execution of the tasks based on the availability of enabled or enableable energy sources at appropriate locations. An example is shown in the process 400 of FIG. 4. At stage 401, the drone is assigned two or more tasks, with at least two of the tasks having the same priority or not having any priority assigned.

The drone determines at stage 403 whether a first of the at least two tasks can be achieved from the location of the dedicated charging pad. If the drone is able to perform the first task while located at the charging pad, then the drone so executes the first task at stage 405. Otherwise the process 400 moves to stage 407, wherein the drone determines whether a second of the at least two tasks can be achieved from the location of the dedicated charging pad. If the drone is able to perform the second task while located at the charging pad, then the drone so executes the second task at stage 409.

If neither the first nor second task can be executed from the charging pad, the process 400 flows to stage 411, wherein the drone determines whether the first task can be completed from a location away from the charging pad while harvesting energy from an energy source already enabled at that location. If the first task can be completed in this way, then the process 400 moves to stage 413, wherein the drone executes the first task in the described manner. If the drone cannot complete the first task in this manner, then the process 400 flows to stage 415, wherein the drone determines whether the second task can be completed in this manner. If so, then the drone so executes the second task at stage 417.

If neither the first nor second task can be executed from a location away from the charging pad while harvesting energy from an energy source already enabled at that location, then the process flows to stage 419. At this stage, the drone determines whether the first task can be completed from the same location using energy from an energy source that is not yet enabled but that the drone is able to wirelessly enable, e.g., via an IoT command. In the event that this can be accomplished, the drone enables the energy source at that location in stage 421 and executes the first task while harvesting energy from the now-enabled energy source. Otherwise, the process moves to stage 423 wherein the drone determines whether the second task can be completed from the same location using energy from the described energy source if the drone were to wirelessly enable it. In the event that this can be accomplished, the drone enables the energy source at that location in stage 425 and executes the second task while harvesting energy from the now-enabled energy source.

However, it may be the case that none of the execution and charging scenarios evaluated thus far in the process 400 enable the drone to execute its first or second task. In this case, the drone determines at stage 427 whether it is able to execute the first task while operating solely on battery power. If the drone is able to execute the first task in this way, then the drone executes the task in this manner at stage 429. Otherwise, the process moves to stage 431, wherein the drone determines whether it is able to execute the second task while operating solely on battery power. If the drone is able to execute the second task in this way, then the drone executes the second task in this manner at stage 433.

It may be that neither the first nor the second task can be executed from the charging pad, from a location away from the charging pad using an enabled source, from such a location using an enableable energy source, or from such a location solely on battery power. In this case, the process 400 moves to stage 435, wherein the drone defaults back to the charging pad to await cancellation of the assigned task, or modification of the assigned task or its priority.

It will be appreciated that various systems and processes have been disclosed herein. However, in view of the many possible embodiments to which the principles of the present disclosure may be applied, it should be recognized that the embodiments described herein with respect to the drawing figures are meant to be illustrative only and should not be taken as limiting the scope of the claims. Therefore, the techniques as described herein contemplate all such embodiments as may come within the scope of the following claims and equivalents thereof.

We claim:

1. A drone device that provides drone-based power search and harvesting, the drone device comprising:
    one or more motive drivers configured to provide movement to the drone device when activated;
    an energy harvesting mechanism receiving energy and converting it to electrical power;
    a battery storing electrical power; and
    a processor configured to manage two or more tasks, each task having a priority associated therewith, with a highest priority task of the two or more tasks having a highest priority of any of the two or more tasks and a second highest priority task having a second highest priority that is less than the highest priority, by determining a power mode for executing the highest priority task;
    wherein determining a power mode for executing the highest priority task comprises sequentially determining whether the highest priority task can be executed in one of a plurality of execution scenarios including from a charging pad associated with the drone device, from another location using energy harvested from an existing energy source, from another location using energy harvested from an energy source enabled by the drone device, and from another location using battery power alone.

2. The drone device in accordance with claim 1, further comprising, after determining whether the highest priority task can be executed in each execution scenario of the plurality of execution scenarios, executing the second highest priority task, wherein the processor is further configured to cause the drone device to return to the charging pad after executing the second highest priority task.

3. The drone device in accordance with claim 2, wherein the processor configured to cause the drone device to return to the charging pad after executing the second highest priority task if the highest priority task cannot be executed by any of the plurality of execution scenarios.

4. The drone device in accordance with claim 1, wherein the one or more motive drivers include one or more ducted fans.

5. The drone device in accordance with claim 1, wherein the two or more tasks are assigned by the processor autonomously.

6. The drone device in accordance with claim 1, wherein the energy harvesting mechanism comprises a thermoelectric harvesting mechanism, wherein the thermoelectric harvesting mechanism is energized when the drone lands on a hot or cold surface.

7. The drone device in accordance with claim 1, wherein the energy harvesting mechanism comprises at least one of a solar panel, a turbine, a thermoelectric converter, a piezoelectric converter and an antenna.

8. The drone device in accordance with claim 1, wherein the processor is further configured to locate the existing energy source and the energy source enabled by the drone device.

9. The drone device in accordance with claim 1, wherein the processor is further configured to locate the existing energy source and the energy source enabled by the drone device by using at least one of a sensor set and a map.

10. A method of executing one or more tasks in a drone having one or more motive drivers configured to provide movement to the drone when activated, an energy harvesting mechanism for receiving energy and converting it to electrical power and a battery for storing electrical power, each task having a priority associated with it, and a highest priority task having a priority that is the highest of any of the one or more tasks, the method comprising:
    determining a power mode for executing the highest priority task by sequentially determining whether the highest priority task can be executed in each one of a plurality of execution scenarios including from a charging pad associated with the drone, from another location using energy harvested from an existing energy source, from another location using energy harvested from an energy source enabled by the drone, and from another location using battery power alone.

11. The method in accordance with claim 10, further comprising modifying a priority of the highest priority task if the highest priority task cannot be executed by any of the plurality of execution scenarios after considering all execution scenarios of the plurality of execution scenarios.

12. The method in accordance with claim 11, wherein the one or more motive drivers include one or more chemical reaction thrusters.

13. The method in accordance with claim 10, further comprising canceling the highest priority task if the highest priority task cannot be executed by any of the plurality of execution scenarios after considering all execution scenarios of the plurality of execution scenarios and while the drone defaults to being situated on the charging pad.

14. The method in accordance with claim 10, further comprising modifying at least one task associated with the highest priority task if the highest priority task cannot be executed by any of the plurality of execution scenarios after considering all execution scenarios of the plurality of execution scenarios and while the drone defaults to being situated on the charging pad.

15. The method in accordance with claim 10, wherein the drone includes one or more probes for attachment to one or more energy sources and wherein executing the highest priority task comprises attaching the drone to an energy source via the one or more probes.

16. The method in accordance with claim 10, wherein using energy harvested from one of an existing energy source and an energy source enabled by the drone comprises harvesting energy via at least one of a solar panel, a turbine, a thermoelectric converter, a piezoelectric converter and an RF antenna.

17. The method in accordance with claim 10, wherein the one or more tasks comprise two or more tasks, further comprising executing a lower priority task of the two or more tasks if the highest priority task cannot be executed by any of the plurality of execution scenarios after considering all execution scenarios of the plurality of execution scenarios.

18. The method in accordance with claim 17, wherein the lower priority task is executed before the drone returns to the charging pad.

19. A method of executing a task via a drone, the method comprising:
receiving a task to be executed by the drone, the task requiring energy;
locating two or more energy sources including a drone charging pad and at least one other energy source that is not a drone charging pad;
determining whether the task can be executed by the drone from the location of the drone charging pad;
determining whether the task can be executed by the drone from a location of the other energy source by harvesting energy from the other energy source;
determining whether the task can be executed using battery power associated with the drone;
causing the drone to rest at the drone charging pad after each of:
determining whether the task can be executed by the drone from the location of the drone charging pad;
determining whether the task can be executed by the drone from a location of the other energy source by harvesting energy from the other energy source; and
determining whether the task can be executed using battery power associated with the drone.

20. The method in accordance with claim 19, further comprising awaiting a cancelation or modification of the task while the drone rests at the drone charging pad.

\* \* \* \* \*